(12) United States Patent
Smith et al.

(10) Patent No.: US 7,924,549 B1
(45) Date of Patent: Apr. 12, 2011

(54) CARBON ELECTRODES AND ELECTROCHEMICAL CAPACITORS

(75) Inventors: W. Novis Smith, Philadelphia, PA (US); Joel R. McCloskey, Philadelphia, PA (US); James J. Gormley, Ardsley, PA (US)

(73) Assignee: Lithdyne, LLC

( * ) Notice: Subject to any disclaimer, the term of this patent is extended or adjusted under 35 U.S.C. 154(b) by 261 days.

(21) Appl. No.: 12/287,867

(22) Filed: Oct. 14, 2008

(51) Int. Cl.
*H01G 9/00* (2006.01)

(52) U.S. Cl. ........ 361/502; 361/503; 361/504; 361/509; 361/512; 361/523

(58) Field of Classification Search .................. 361/502, 361/503–504, 509–512, 516–519, 523–525, 361/303–305, 528–529
See application file for complete search history.

(56) References Cited

U.S. PATENT DOCUMENTS

| | | | | |
|---|---|---|---|---|
| 6,226,173 | B1 * | 5/2001 | Welsch et al. | 361/508 |
| 6,249,424 | B1 * | 6/2001 | Nitoh et al. | 361/523 |
| 6,315,918 | B1 * | 11/2001 | Mita et al. | 252/62.2 |
| 6,728,096 | B1 * | 4/2004 | Smith et al. | 361/523 |
| 7,411,777 | B2 * | 8/2008 | Chiba | 361/502 |
| 7,430,108 | B2 * | 9/2008 | Ozawa et al. | 361/523 |
| 7,436,651 | B2 * | 10/2008 | Takeda et al. | 361/502 |
| 7,675,737 | B1 * | 3/2010 | Smith et al. | 361/523 |

* cited by examiner

*Primary Examiner* — Nguyen T Ha
(74) *Attorney, Agent, or Firm* — John Lezdey

(57) ABSTRACT

Carbon electrodes for a capacitor having conditioned carbon elements in combination with a high concentration of an electrolyte tetrafluoroborate salt and a non-aqueous aprotic solvent to provide an operational voltage up to 4.5V and capacitors used with the carbon electrodes.

13 Claims, 2 Drawing Sheets

CARBON ELECTRODES AND ELECTROCHEMICAL CAPACITORS

FIELD OF THE INVENTION

The present invention relates to conditioned carbon for electrodes and electrochemical capacitors containing the electrodes. More particularly, there is provided a synergistic improvement when a capacitor utilizes a conditioned carbon for electrodes of the invention in combination with a non-aqueous non-acetonitrile electrolyte having a high concentration of an electrolyte salt which is a quaternary tetrafluoroborate salt.

BACKGROUND OF THE INVENTION

Activated carbon is the preferred material for use in preparing electrodes for carbon electrode capacitors. This activated carbon is prepared from a number of different sources such as coconut shells, wood, sugar, cellulosics and phenolic resins. After converting these materials to carbon under steam controlled conditions, the carbons are "activated" in a second step using steam or catalyzed with KOH, or carbon dioxide and KOH to increase the surface area to very high surface areas such as 1000 to 2400 $m^2/g$. These activated carbons usually contain about 2% oxygen after they have been thoroughly dried and traces of inorganic salts. This oxygen is probably present as quinones, hydroquinones, phenols, carboxylic acids, furans and possibly ketones etc. with some nitrogen compounds—all of which under higher voltage conditions greater than 3 V. will undergo electrochemical oxidation/reduction as the voltage is increased past 3.3 V. At lower voltages, these functional groups actually improve the energy storage capacity of the carbon and are desirable at voltages below 3.2 V.

However as the voltage is pushed higher than 3.2 V a high leakage current with gas formation, an increase in the ESR (resistance), and loss of performance occurs.

Electrochemical double layer capacitors capable of high energy density, known as "super-capacitors", have been assembled from a variety of materials. In general, it is desirable to construct super-capacitors with light weight materials and electrolytes that are stable and non reactive, as described in U.S. Pat. No. 5,260,855 issued to Kaschmitter et al, the teachings of which are hereby incorporated by reference. This type of super-capacitor incorporates electrodes based on carbon may be prepared from organic gels.

U.S. Pat. No. 6,902,683 to Smith et al, which is herein incorporated by reference relates to electrolytes of a complex salt formed by mixing of a tetraalkyl ammonium salt of hydrogen fluoride with an imidazolium compound in a nitrile solvent which operate at temperatures between –60 and 150° C.

The article of Ue in *J. electrochem. Soc*. Vol 141, No. 11, November 1994 entitled "*Electrochemical Properties of Organic Liquid Electrolytes Based on Quaternary Onium Salts for Electrical Double-Layer Capacitors*" which is herein incorporated by reference, discloses high permittivity solvents and onium salts for double-layer capacitors. Specifically studied were quaternary onium tetrafluoroborate salts which showed greater solubility in the solvents with good stability and conductivity.

U.S. Pat. No. 5,418,682 to Warren et al, which is herein incorporated by reference discloses a method of preparing tetraalkyl ammonium tetrafluoroborate salts for use as electrolytes with dinitrile mixtures as solvents.

U.S. Pat. Nos. 6,535,373 and 6,902,684 to Smith et al, which are herein incorporated by reference, disclose similar electrolytes which primarily utilize nitrile solvents.

SUMMARY OF THE INVENTION

According to one embodiment of the invention there is provided improved carbon electrodes for higher voltage electrochemical double layer capacitors (EDLC) and their method of preparation.

The carbon electrodes are prepared in discs formed from carbon particles which have been heat treated between 850° C. and 1300° C., preferably about 1050° C. to 1190° C. in an inert atmosphere or vacuum for about 30 to 60 minutes. This carbon was formed into 4 mm sheets with a Kynar binder and then cut into electrode discs. Then these electrodes were tested using a voltage ramp upon the disc in a capacitor test cell of 2 to 4.4 volts in 0.5 increments while holding for three cycles in each step under an inert atmosphere.

In accordance with another feature of the invention the electrolyte of the EDLC comprises an aprotic non-acetonitrile non-aqueous solvent and at least one tetraalkyl ammonium tetrafluoroborate salt in a higher concentration (2.0 to 4.0 M; 20-55% by weight).

Advantageously, an aluminum metal collector is used with the capacitor electrode.

It is a general object of the invention to provide an EDLC having an operating voltage up to 4.0-4.5 V.

According to a feature of the invention, the activated carbon particles which have been treated are formed into a sheet and then cut into a disc for an electrode which is comprised of a metal collector wherein the carbon is on the top and bottom surfaces of the collector, a second conductive carbon layer on which said heat treated carbon layers is placed and a porous inert separator between said conductive carbon layer.

It is a general object of the invention to prepare a carbon electrode for a capacitor which contains discs comprised of post treated activated carbon particles which do not contain ash, silica or functional oxygen or sulfur compounds.

It is another object of the invention to provide a capacitor with a carbon electrode which operates at higher voltage (>3.0 to 4.5 V).

The invention will become better understood from a reading of the preferred embodiment of the invention and the drawings.

DESCRIPTION OF THE PREFERRED EMBODIMENTS

According to the present invention there is provided an improved electrochemical carbon electrode double layer capacitor (EDLC) which has electrochemical stable carbon electrodes with an electrolyte having a conductivity of about 20-30 mS/cm at 25° C. and rises to 65 mS/cm at about 80° C. which comprises a non-aqueous, non-acrylonitrile electrolyte and at least one conductive ammonium salt of the formula:

$RR_1R_2R_3NBF_4$ wherein R, $R_1$, $R_2$ and $R_3$ are ethyl or methyl groups or R, $R_1$, $R_2$ and $R_3$ are one or two pyrrolidinyl groups in a concentration of 2.0 to 4.0M in a solvent selected from the group consisting of ethylene carbonate, propylene carbonate, gamma butyrolactone or dimethyl carbonate mixtures thereof. The carbon of the electrode is activated carbon which has been heated between 850° C. to 1300° C. in an inert atmosphere for about 30 to 60 minutes, and then formed into discs. Preferably the carbon has been acid washed before to remove ash. The capacitor with the discs is tested at constant voltage of 3.5 to 4.5 V.

The preferred ammonium salts have the molecular weight in the range of 175 to 250. More preferable salts are diethyldimethylammonium tetrafluoroborate (DEDMA $BF_4$) and ethylmethylpyrrolidinyl tetrafluoroborate. The preferred solvents are ethylene carbonate (EC) in combination with gammabutyrolactone (GBL) or propylene carbonate (PC) or dimethyl carbonate (DMC) at a ratio of about 40% EC to 70% of GBL, PC, DMC or mixtures thereof.

An electrode to be used in the capacitor is prepared by acid washing then heat treating the activated carbon used in the electrode between 850° C. and 1300° C. preferably 1000-1300° C. in an inert atmosphere or vacuum for about 30 to 60 minutes, forming carbon discs for the electrode and then subjecting a capacitor with the electrode to a constant voltage cycling in the range 3.5 to 5 V.

Figure 1:
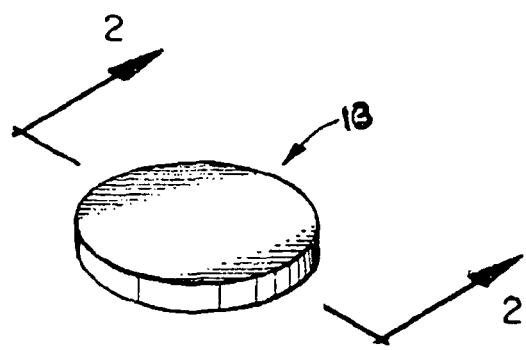
FIG. 1 is an elevational view of a carbon disc for an electrochemical double layer capacitor electrode of the invention.
Figure 2:
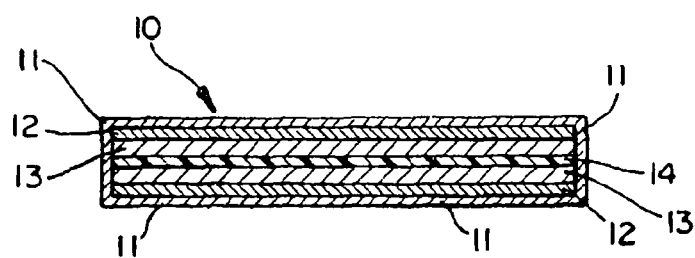
FIG. 2 is a cross-sectional view of an electrode with the disc of FIG. 1

As shown in FIGS. 1 and 2, the electrode of the invention (10) comprises an aluminum metal foil collector (11) on the top and bottom which are about 1 to 4 mils in thickness. On the collector (11) are an optional conductive carbon coatings (12) in a thickness of about 0.5 to 1 mil. On coatings (12) are the discs (13) which comprises conditioned higher surface area conductive carbons with a binder in a thickness of about 2 to 5 mils. A conventional porous insulating separator (14) having a thickness of about 0.5 to 3 mils is used between the conductive carbons (13). The coatings (12) may also comprise the same treated carbon found in layers (13).

The separator (14) can comprise any conventional inert separator used in making carbon electrodes. A preferred separator is porous Teflon. The electrodes used may be symmetrical or asymmetrical.

The discs with conductive carbon layer (13) comprise the pretreated conductive carbon prepared according to the invention in combination with an inert polymeric binder such as polytetrafluoroethane, Surlyn or Kynar that is present in an amount of about 6% by weight.

The disc layers (13) can be prepared by mixing about 0.02 grams of the treated carbon with about 6% of polytetrafluoroethane or Kynar in an acetone solvent, rolling back and forth the mixture under pressure to form a layer of about 2 to 5 mils in thickness and ⅝" circular that is die cut and vacuum dried. The particle size of the carbon particles is about 0.5-10 microns. The disc can comprise different shapes, i.e. square, rectangular, circular, etc.

Alternatively, the active carbon can be prepared by treating the carbon particles used to form the electrode disc (13) after acid ball milling to about 0.5 to 10 microns, preferably 3-6 microns and then by a heat treatment in a furnace to remove oxygen and sulfur functional groups at 850-1300° C., preferably 1100° C., followed by washing and drying under vacuum. The heat treatment steps being carried out in an inert atmosphere.

The post treated activated carbon is then formed into a disc (13) and then placed into a capacitor test cell with an electrolyte subjected to a constant voltage cycling from 2 to 4.1 V.

The capacitor is provided with a means for degassing the carbon disc in the electrode to remove gasses formed during the initial voltage cycling (less than 10 cycles).

The Aluminum Collector

The aluminum collector used in the electrode is preferably made from plain annealed aluminum foil with a coating of a water based conductive carbon acrylic coating such as a commercial Acheson's carbon acrylic conductive coating which is then baked on at 200° C. The aluminum after the burn-in and degassing is suitable for the anode or the cathode.

The past treated activated carbon may be formulated with Kynar® and coated directly on the aluminum collector foil in a 3-6 mm thick electrode layer. This can be on one or both sides.

Preferred Electrolyte

A preferred solvent comprises the combination of ethylene carbonate (EC) and one or more of the group gamma butyrolactone (GBL), propylene carbonate or dimethyl carbonate wherein ethylene carbonate comprises at least 20% by weight, preferably 40 to 60% by weight.

The salt concentration is at least 1.0M, preferably 1.5 to 5.2M most preferred range is 1.5-3.5M. A mixture with Spiro or bis-pyrrolidinyl ammonium tetrafluoroborate also provides good low temperature efficiency.

These improvements are seen more significant for those electrolytes when the ionic salt content is more than 2.5 to 4.0 M and twice as much as the current electrolytes which results in even better efficiency in charge/discharge capacitance than implied from the conductivity values alone.

It was found that ethylene carbonate (EC) was essential to achieve significant improvement in conductivity over the current non-acetonitrile aprotic electrolytes (18-19 mS/cm) based on propylene carbonate (PC) alone.

Example 1

Preparation of Electrode

A. The carbon electrodes can be seen in FIGS. 1 and 2 prepared by forming an acetone slurry of 10% Kynar® resin and 90% carbon (0.5-10 microns) which have been treated to remove ash and silica. The mixture is cast onto a flat Teflon sheet and then the acetone is allowed to evaporate. The dried sheet is removed from the Teflon and ⅝" circular electrodes are die cut and vacuum dried. The electrodes weigh about 0.01 gram and are 4 mil in thickness.

Figure 3:
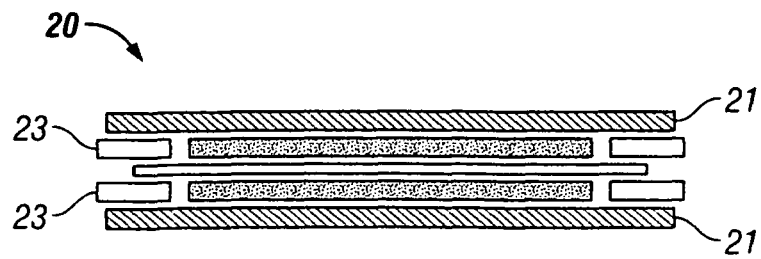
FIG. 3 is a cross-sectional view of another electrode of the invention.
Figure 4:
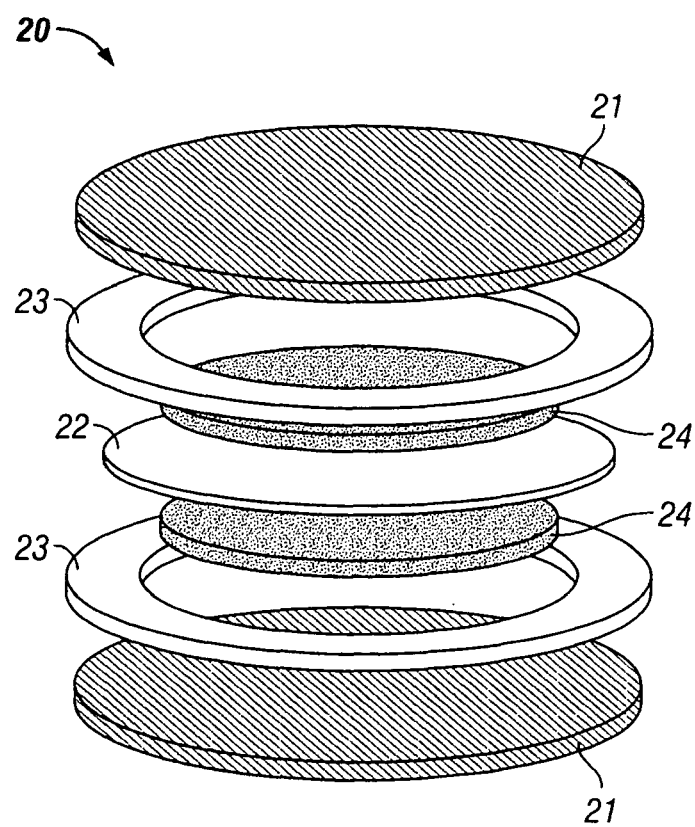
FIG. 4 is an exploded view of the electrode of FIG. 3.

B. Alternatively, a carbon electrode (20) can be prepared as seen in FIGS. 3 and 4 by preparing the end plates (21) from a sheet of aluminum coated with a thin liquid conductive carbon dispersion and then baked. One dry, proper sized discs (21) are punched from the sheet and put on a roller to flatten the edges. Surlyn® rings (23) are then heat sealed to the end plates (21). The heat treated carbon is then made into a paste with 10% Surlyn binder and acetone. The paste is rolled into a sheet of about 4 mm of Teflon sheeting. The acetone is evaporated and then punched to size to fit within the Surlyn rings. The carbon electrodes (24) are then baked under vacuum to remove any moisture. The separator (22) is a 0.5 mil thick porous Teflon disc which is slightly smaller than end plates (21) but larger than the electrodes (24). The electrodes (24) are soaked in the proper electrolyte before assembly then placed within the Surlyn rings. The separator is centered on one Surlyn ring assembly. The other Surlyn ring assembly is then placed on top of the other assembly and the entire assembly is heat sealed together.

Example 2

Comparison of Capacitor Test Cells with DEDMABF4 in EC/GBL Electrolyte Using Post-Treated OSAKA PC Carbon Electrode (0.008 g)

| CONCENTRATION OF ELECTROLYTE DEDM-BF4, EC-GBL | ESR | LEAKAGE EIS | CAPACITANCE (FARADS) | RELATIVE MACCOR ENERGY mAh |
|---|---|---|---|---|
| 1.00 M, 1100° C. (Carbon Treatment) | 1.5 | VG none | 0.29 (2.0 V) 0.30 (3.0 V) 0.32 (4.2 V) | 0.09 0.13 0.24 |
| 2.50 M, 1000° C. | 1.8 | VG none | 0.29 (2.0 V) 0.30 (3.0 V) 0.32 (4.2 V) | 0.09 0.13 0.24 |
| 2.50 M, 1100° C. | 1.4 | VG none | 0.37 (2.0 V) 0.38 (3.0 V) 0.38 (4.2 V) | 0.09 0.13 0.29 |
| 3.25 M, 1100° C. | 1.4 | VG none | 0.37 (2.0 V) 0.38 (3.0 V) 0.38 (4.2 V) | 0.12 0.15 0.31 |

The greater molarity results in improved energy

Example 2

Comparison of Capacitor Test Cells with DEDMABF4 in 50/50 EC/PC Electrolyte Using Post-Treated Norit 30 Carbon (0.008 g)

| CONCENTRATION OF ELECTROLYTE DEDM-BF4, EC-PC | ESR | LEAKAGE EIS | CAPACITANCE (FARADS) | RELATIVE MACCOR ENERGY (100 cycles) mAh |
|---|---|---|---|---|
| 1.00 M | 0.65 | VG none | 0.50 (2.0 V) 0.69 (4.1 V) | NA 0.29 |
| 1.5 M | 0.67 | VG none | 0.56 (2.0 V) 0.72 (4.1 V) | NA 0.35 |
| 2.0 M | 0.64 | VG none | 0.37 (2.0 V) 0.84 (4.1 V) | NA 0.34 |
| 3.0 M | 0.52 | VG none | 0.72 (4.1 V) | 0.36 |

The greater molarity results in improved energy

What is claimed is:

1. In a non-aqueous electrochemical capacitor having sealed carbon electrodes, the improvement which comprises at least one carbon electrode comprising;

a) a metal collector on the top and bottom surfaces;
b) optionally a first conductive carbon layer on each of the top and bottom interior surfaces of the collectors;
c) a porous second conductive carbon layer on each of said first conductive carbon layers, said second conductive carbon layers being substantially free of oxygen and heteroatom containing functional groups and being degassed,
d) a porous inert separator between said second conductive carbon layers; and
e) an electrolyte having a quaternary ammonium tetrafluoroborate salt concentration of at least 1.5M in an aprotic solvent.

2. The capacitor of claim 1 comprising a non-acetonitrile electrolyte.

3. The capacitor of claim 2 wherein said electrolyte comprises an aprotic solvent and at least one tetraalkyl ammonium tetrafluoroborate salt.

4. The capacitor of claim 3 wherein the salt concentration is 2.0 to 4.8 M.

5. The capacitor of claim 2 wherein the electrolyte solvent comprises two members selected from the group consisting of ethylene carbonate, propylene carbonate, gamma butyrolactone and dimethyl carbonate.

6. The capacitor of claim 1 comprising an aluminum metal collector.

7. In a capacitor having a carbon electrode the improvement which comprises that said carbon in the electrode was heat treated to remove oxygen and sulfur functional groups and silica by heating at a temperature between 850 and 1300° C., formed into at least one disc that is used in the electrode which is placed in said capacitor and which undergoes a burn-in with a voltage ramp-up to 4.4 and degassed.

8. The capacitor of claim 7 in which the electrolyte for the electrode comprise a conductive tetraammonium salt of the formula:

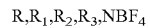

$R, R_1, R_2, R_3, NBF_4$ wherein R, $R_1$, $R_2$, $R_3$ are ethyl or methyl groups or together R, $R_1$, $R_2$ and $R_3$ are one or two pyrrolidinyl groups in an aprotic solvent.

9. The capacitor of claim 7 wherein the electrolyte solvent is at least two members of the group consisting of ethylene carbonate, propylene carbonate dimethyl carbonate and gamma butyrolactone.

10. The capacitor of claim 7 wherein the salt concentration is about 1.5 to 4.8 M.

11. The capacitor of claim 7 wherein the electrolyte solvent comprises about 40-60% ethylene carbonate.

12. The capacitor of claim 7 which comprises an annealed aluminum collector.

13. The capacitor of claim 7 wherein said carbon in the electrode is acid washed prior to heat treatment to remove ash and salts.

* * * * *